July 8, 1958

P. I. D'ANTINI 2,842,372

SAFETY STEERING WHEEL WITH INFLATABLE CUSHION FOR VEHICLES

Filed April 19, 1957

INVENTOR.
PASQUALE I. D'ANTINI,
BY
McMorrow, Berman & Davidson
ATTORNEYS.

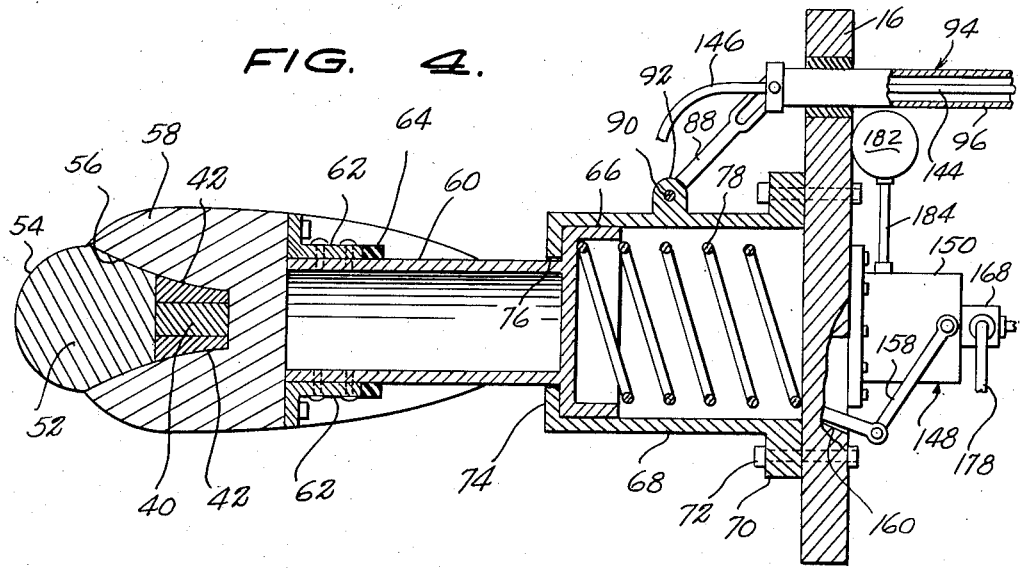
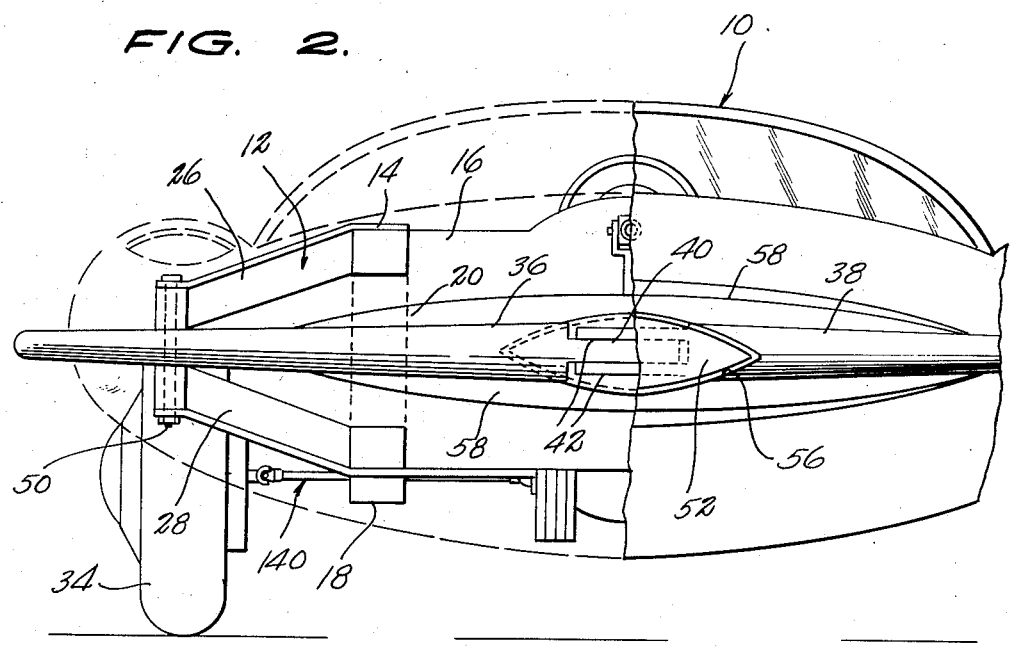

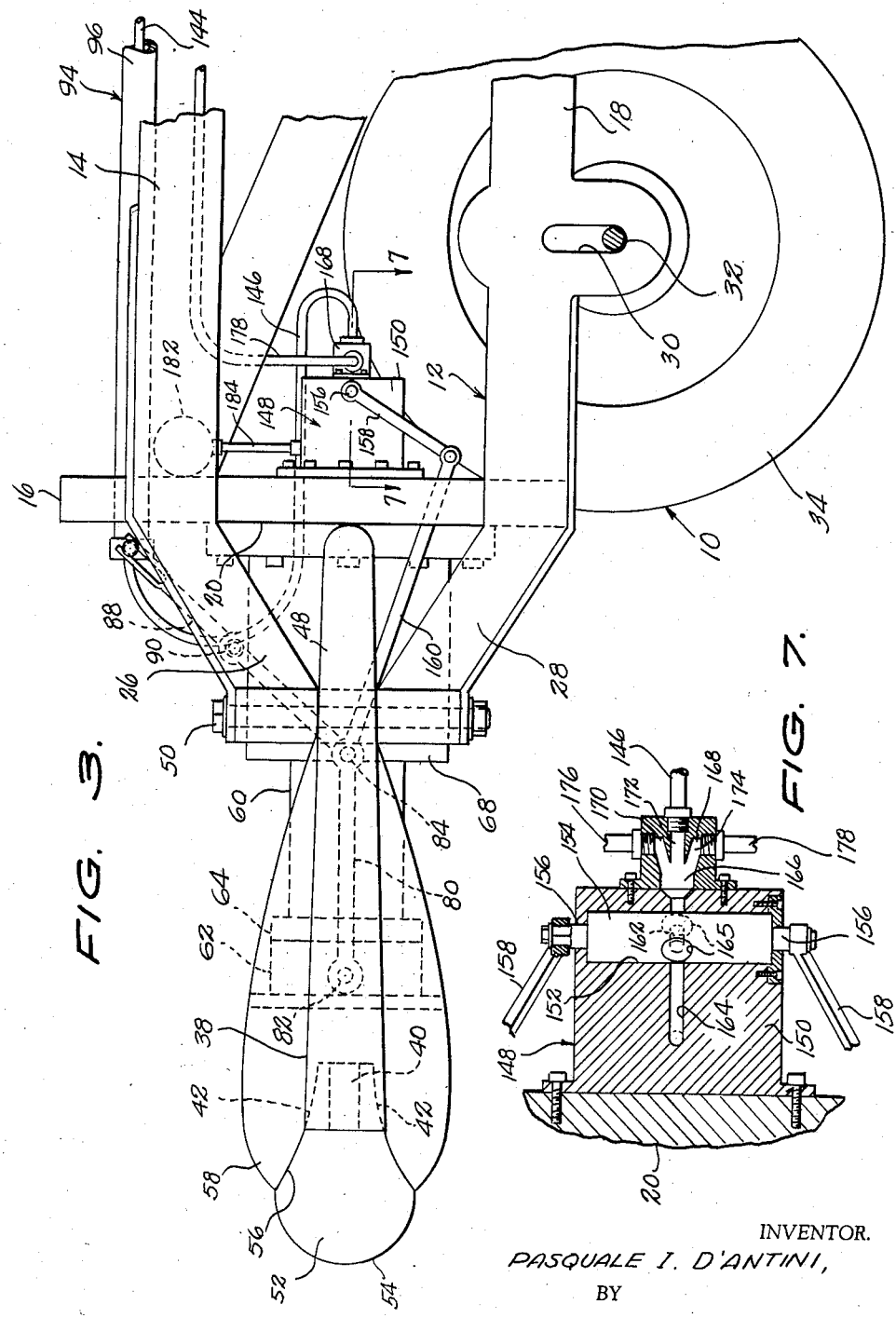

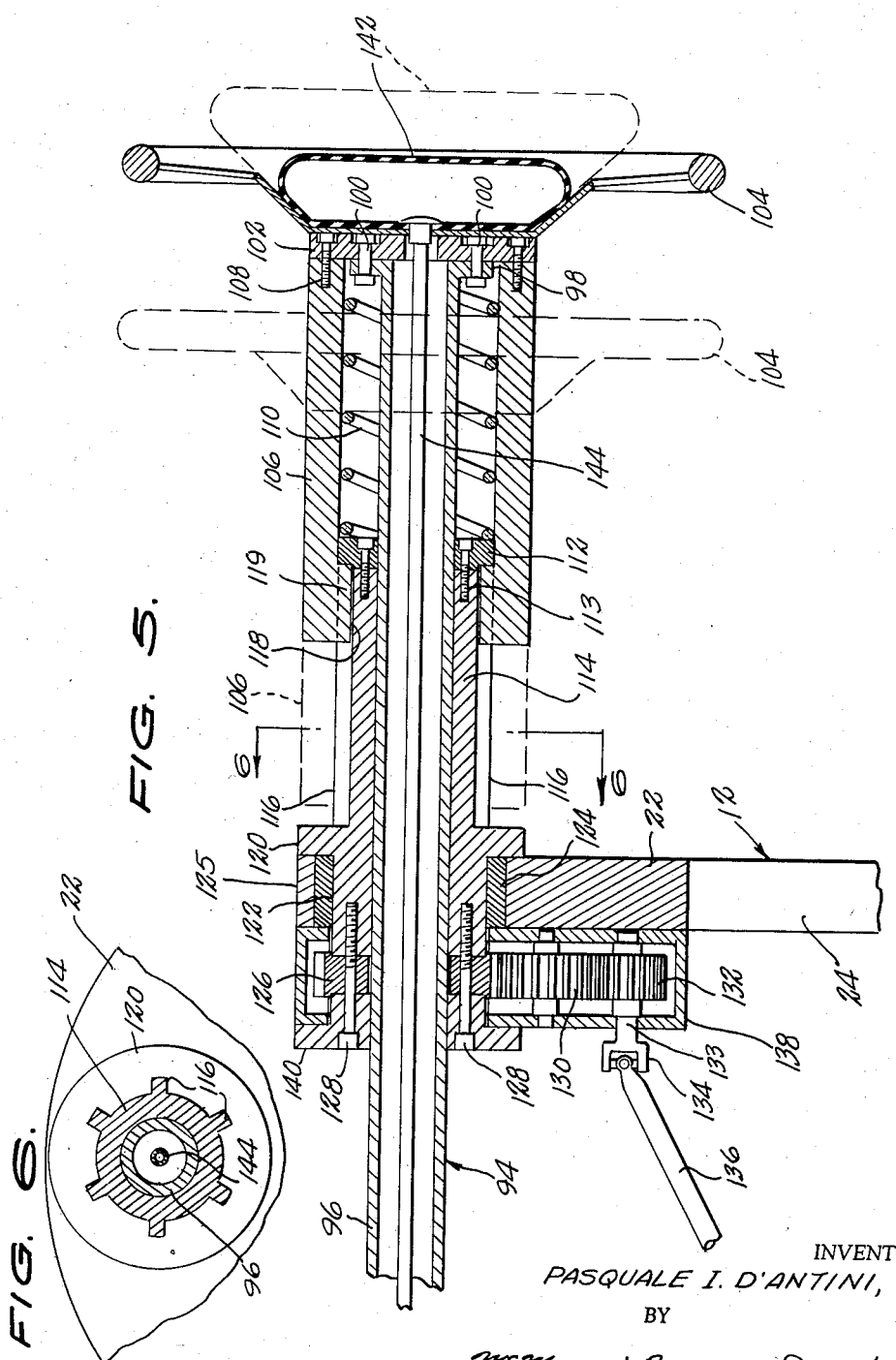

United States Patent Office 2,842,372
Patented July 8, 1958

2,842,372

SAFETY STEERING WHEEL WITH INFLATABLE CUSHION FOR VEHICLES

Pasquale I. D'Antini, Toronto, Ontario, Canada

Application April 19, 1957, Serial No. 653,857

9 Claims. (Cl. 280—29)

This invention relates to a vehicle construction so designed as to incorporate in the vehicle an assembly adapted to receive the force or impact on collision of the vehicle with another vehicle, said assembly having embodied therein resilient, articulated, and pneumatic shock absorption means specially designed to provide maximum protection for the vehicle passengers.

As is well known, the continuing increase in automobile traffic throughout the world, while bringing with it many conveniences and advantages, has had the corollary results of producing an increasingly higher incidence of fatal accidents, resulting particularly from collisions between vehicles.

While of course vehicles are equipped with bumpers and other shock-absorption devices designed to reduce the force of impact, and while these devices do serve their intended purposes, they are still characterized by a marked inadequacy to solve the problem of fatalities and serious injuries resulting from collisions. This is well demonstrated by the fact that despite the equipping of almost all passenger vehicles with bumpers, vehicle collisions result, all too often, in fatal injury to the driver and passengers.

The broad object of the present invention is to provide an improved construction, in a collision-impact-receiving assembly of an automobile, that will be far better adapted to stave off serious injuries on collisions, than the mentioned, conventional impact-receiving means previously described herein, and presently in widespread use.

Still another object is to provide a shock-absorbing vehicle construction, such that certain of the various rigid or rigidly connected components of a vehicle will be eliminated, reference being particularly had here to those rigid parts of an automobile of conventional design that tend to produce injuries when a human body is thrown against them in a collision.

Another object is to provide a coactive relationship of resilient, pneumatic, and articulated components, designed to produce, to the maximum extent, safety so far as the driver and passengers are concerned, and designed, further, to produce maximum protection for the front of the vehicle against damage, despite comparatively heavy impacts suffered during a collision.

A further object of importance is to provide a safety shock-absorbing vehicle structure so designed that the shock occurring on impact will be taken up in parts of the vehicle designed to best withstand said shock, and designed to absorb the shock without injury of the driver or passengers.

A further object of importance is to provide a safety, shock-absorbing system of the character stated that will be of a design such as to be particularly adapted for incorporation in modern vehicles, without detracting from the appearance or functional characteristics of said vehicles.

Another object is to provide a safety shock-absorbing system for vehicles, so designed as to effect, responsive to the involvement of the vehicle in a collision, a resilient retraction of the steering wheel (which has heretofore been one of the main factors contributing to fatal injuries), and further designed to effect, simultaneously with said retraction of the steering wheel, inflation of protective cushions located adjacent the driver and passengers.

Another object is to provide, in a system of the type stated, means responding to the involvement of the vehicle in collisions, which means will have a particular adaptability for almost completely absorbing shocks, even when the impact is received in a glancing rather than as a head-on blow.

Other objects will appear from the following description, the claims appended thereto, and from the annexed drawing, in which like reference characters designate like parts throughout the several views, and wherein:

Figure 2 is a fragmentary front elevational view of the vehicle, a portion of the vehicle body being broken away;

Figure 3 is an enlarged, fragmentary elevational view of the vehicle as seen from the line 3—3 of Figure 1;

Figure 4 is an enlarged, fragmentary longitudinal sectional view of the construction as seen from the line 4—4 of Figure 1;

Figure 5 is a fragmentary, longitudinal sectional view on an enlarged scale of the construction as taken on line 5—5 of Figure 1, illustrating the steering mechanism, the steering wheel being shown in full and dotted lines in its normal and retracted positions respectively;

Figure 6 is an enlarged, detail sectional view through the steering column substantially on line 6—6 of Figure 5; and Figure 7 is an enlarged, fragmentary sectional view taken on line 7—7 of Figure 3.

Figure 1:
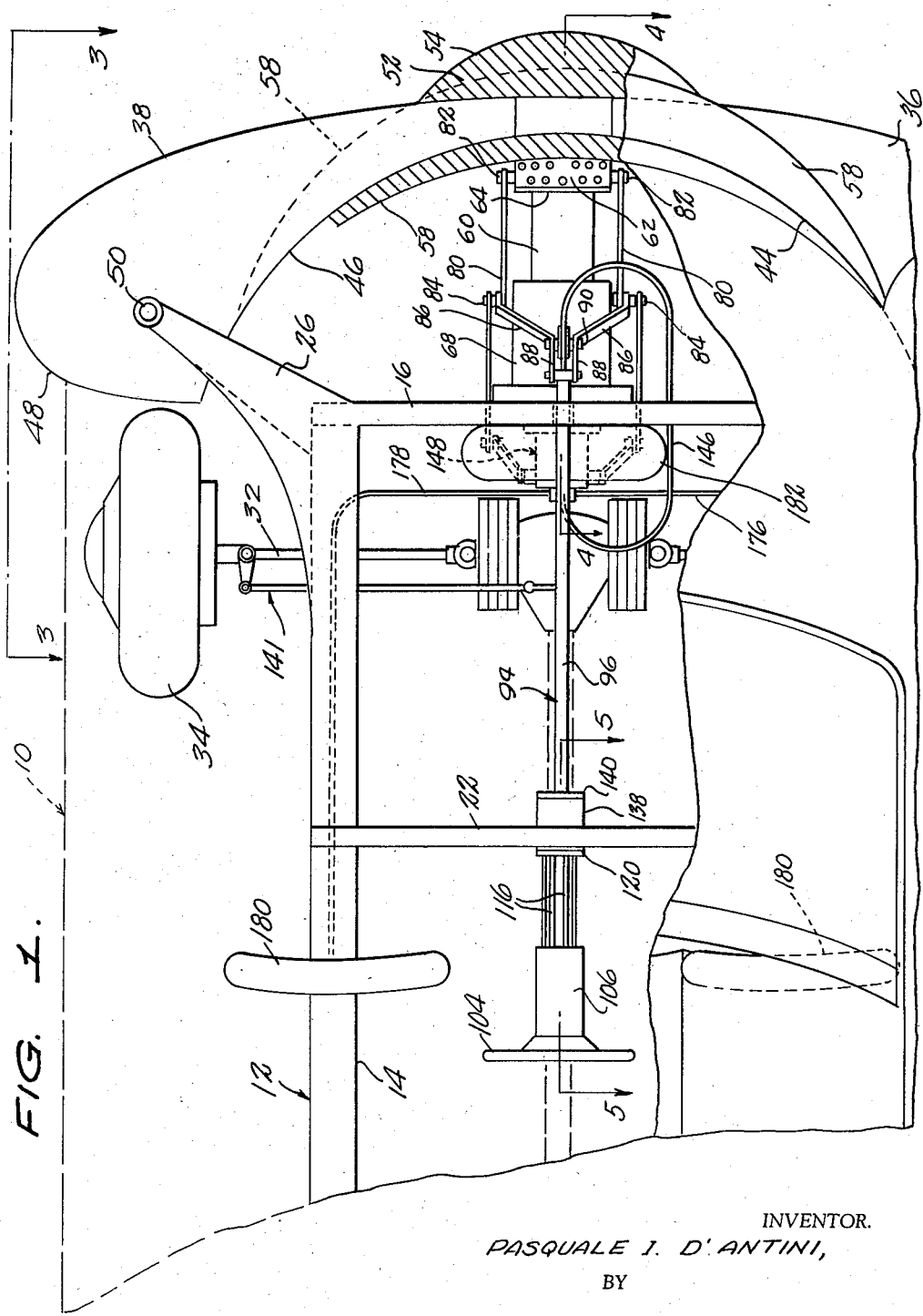
Figure 1 is a fragmentary plan view of the head end of a vehicle, in which the vehicle body is shown partly broken away to expose the shock-absorbing assembly, said assembly being illustrated partly in horizontal section.

Referring to the drawings in detail, designated generally at 10 is a vehicle, including a frame generally designated at 12, said frame including a pair of longitudinal or side frame members 14.

The members 14 constitute upper side frame members as best shown in Figure 3, and are rigidly connected, at their forward ends, by a transverse or bridging plate 16. Lower side frame members 18 are extended in parallel relation to the upper members 14, also as best shown in Figure 3, and rigidly connected between the forward extremities of the upper and lower side frame members are front connector members 20 constituting integral extensions of the transverse or bridging plate 16.

Spaced rearwardly from the bridging plate 16 is an intermediate cross member 22, which at its opposite sides is extended downwardly as at 24 (Figure 5) to provide a rigid connection between the intermediate portions of the upper and lower side frame members, at each side of the vehicle. Member 22 is fixedly connected between the members 14, and is adapted to provide a bearing for a steering column, in a manner to be made presently apparent herein.

Integral with and projecting laterally outwardly from the forward extremities of the respective upper side frame members 14 are upper front support arms 26. These are extended not only laterally outwardly (Figure 1) but also forwardly, downwardly from the front ends of the members 14, as best shown in Figure 3. Members 26 are in converging relation to lower front support arms 28, that extend laterally outwardly, while also being extended forwardly upwardly, from the front ends of the lower side frame members 18. Members or arms 26, 28 have the function of providing support brackets on which bumper sections, to be described hereinafter, may pivot when the vehicle is engaged in a collision.

Referring to Figure 3, adjacent the front ends of the lower side frame members 18, said members are formed with vertical slots 30, receiving spindles 32 carrying the front wheels 34. The particular type of wheel suspension can be varied, as desired, and the wheel suspension illustrated is merely illustrative of one of many that can be employed without deviation from the spirit of the invention as described in greater detail hereinafter.

In any event, the front bumper of the vehicle comprises a pair of bumper sections 36, 38 one at each side of the longitudinal median of the vehicle chassis. The bumper sections 36, 38, as shown in Figure 1, form a forwardly bowed bumper, when assembled, and as shown in Figure 2 to best advantage, the sections 36, 38 at their inner ends, that is, at the longitudinal median of the vehicle, are overlapped. Section 36, thus, has a tongue 40 which is embraced by fork arms 42 formed upon the inner end of the section 38.

The sections 36, 38 are progressively increased in width from their overlapped inner ends to their outer ends, as best shown in Figure 1, with the sections having inwardly curved rear longitudinal edges 44, 46 respectively, which diverge relative to the front edges of the bumper sections, in the direction of the outer ends of said sections.

The widened outer ends of the respective bumper sections are rounded, as shown at 48 in Figure 1, and are embraced between the associated bumper section support arms 26, 28 (Figure 3). Aligned openings are formed in the arms 26, 28, and in the associated bumper section, receiving pivot pins 50.

The overlapped inner ends of the bumper sections are encased in a resilient, impact-absorbing cushion 52 (Figure 1), the cushion being fabricated of rubber and having a forwardly bowed front surface 54 which in effect constitutes a segment of a sphere. The cushion 52, in turn, is engaged in a forwardly flaring channel 56 (Figure 4) of an elongated, narrowly elliptical sleeve member 58 enclosing the lapped inner end portions of the bumper sections. The cushion 52 is also of elliptical shape as shown in Figure 2, when seen from the front, and it will thus become apparent that the bumper sections, at their overlapped inner ends, are firmly enclosed in a shock-absorbing, sleeve-like means composed of the cushion 52 and member 58. Further, it is to be noted that the particular shape of these components is such as to particularly adapt the same for absorbing the initial impact of a collision. At the same time, the cushion 52 is bodily yieldable in a rearward direction, so that the overlapped inner ends of the bumper sections may swing rearwardly, about their respective pivots 50.

At the same time, the inherent resiliency of the cushion 52 is such as to cause the same to naturally tend to return to its normal position of Figure 1.

It is interesting to note, from Figure 1, that the member 58, when seen from the front (Figure 2) is of elliptical shape, and has a symmetrical appearance when seen from the front.

The member 58 is also symmetrical when viewed from above (Figure 1), but from this point of view, is crescent-shaped, being bowed forwardly at the midlength point of the front bumper, and being progressively decreased in width toward its trailing extremities.

In any event, it will become apparent that with the overlapped inner end portions of the bumper sections moving rearwardly, and with the cushions 52, 58 also moving rearwardly, there will be shifted in a rearward direction a tubular plunger 60 (Figure 4). Plunger 60 is relatively short in length, and is rigidly constituted, the plunger being extended in coaxial alignment with the longitudinal median of the vehicle structure as shown in Figure 1.

The plunger or piston rod 60, at its front end, is fixedly connected to and between connecting flanges 62, and immediately in back of the connecting flange 62, there is a resilient ring 64 extending continuously about the plunger 60.

The purpose of the ring 64 is to absorb shocks suffered by the flange 62 on impact.

With continued reference to Figure 4, at its rear end the plunger 60 is formed with a cupped piston 66 opening in a rearward direction within a cylindrical piston housing 68 having a proximal end 70 secured by bolts 72 to member 16. The front end wall 74 of the housing 68 is formed with a center opening 76 in which the plunger 60 is axially slidable, said wall 74 providing a stop or abutment limiting piston 66 against movement in a forward direction, that is, to the left in Figure 4. Within housing 68 a compression, coil spring 78 abuts against the piston 66 at one end of the spring, the other end of the spring abutting against the member 16.

Thus, when a collision occurs, not only is the initial impact absorbed by the member 52, but also, the bumper sections are adapted to swing rearwardly about their pivots, further absorbing the shock. Still more shock absorption now takes place, resulting from the movement of the piston inwardly of the housing 68, against the restraint of the spring 78.

Referring now to Figure 1, and also to Figure 3, extending along opposite sides of the plunger 60 and spaced laterally outwardly from the plunger are links 80 the front ends of which are connected by pins 82 to diametrically opposite side portions of the attaching flange 62. The links 80 constitute part of an articulated linkage, the purpose of which will be made more clearly apparent hereinafter, and as will be noted from Figure 1, at their rear ends the links 80 are pivotally connected by pins 84 to yoke arms 86 that converge in an upward direction, in embracing relation to the top portion of the piston housing 68. The yoke arms, at their convergent, upper ends, are respectively rigid with yoke arm extensions 88 which, as shown to best advantage in Figure 3, project rearwardly, upwardly from the arms 86. Arms 86 and their extensions 88 pivot about a horizontal, transverse axis defined by a pivot pin 90 (Figures 3 and 4) that rotates in a pivot bracket 92 integral with and projecting upwardly from the housing 68 medially between opposite sides of the housing.

It will thus become apparent that assuming that a collision has occured, plunger 60 will be shifted rearwardly in the manner previously described. As a result, the cross pin 82 will be shifted rearwardly with the plunger, and will therefore carry rearwardly the links 80. The links 80, being pivotally connected at 84 at their rear ends to the respective yoke arms, will exert a rearward pressure on the lower divergent ends of the yoke arms 86. The yoke arms will thus be caused to pivot counterclockwise in Figure 3 about their common axis 90, and this will cause their integral extensions 88 to swing counterclockwise in Figure 3, for the purpose of bodily shifting in a forward direction a steering column assembly generally designated 94 in the several figures of the drawing.

The desirability of having the steering column assembly shift forwardly immediately upon impact, in the manner described, is well appreciated. Steering columns often tend to cause fatal injuries, in that the driver is thrown against the steering column and steering wheel, with the result that the driver's chest is often crushed against the steering wheel. Further, in many instances the steering wheel itself is bent forwardly, so that the steering column can actually impale the driver. In the invention, the steering wheel and steering column are resiliently mounted for yielding movement in a forward direction upon collision, so as not to stand as a comparatively immovable obstruction in the path of the driver, when the driver is thrown forwardly.

It is appropriate at this time to consider the particular construction of the steering wheel and steering column assembly, since said construction plays a very important part in the above described functioning of the safety steering system. The steering column includes a tube 96 (Figure 5), which at its rear end (Figure 5) has an outwardly directed circumferential flange 98 secured by bolts 100 to a disc or collar 102.

The bolts 100 are extended through arcuate, concentric slots of disc 102, so that disc 102 will rotate upon the axis about which said slots are curved. Fixedly connected to the disc 102 is a steering wheel 104, which is normally disposed in the full line position of Figure 5, but which, when the vehicle is engaged in a collision, shifts to the left in Figure 5 to its forwardly adjusted position, thus yielding under the impact and moving to a position in which it will tend to cause the driver less injury than would normally be the case.

Fixedly connected to the marginal portion of disc 102 is an elongated, forwardly projecting, cylindrical housing 106, one end of which is formed open and has angularly spaced, threaded recesses receiving the connecting bolts 108 that extend through the marginal portion of the disc 102. At its forward end, the housing 106 is provided with an inwardly directed, circumferential flange, and within the housing there is provided a compression, coil spring 110, one end of which abuts against the flange 98 and the other end of which abuts against an annular cushion member 112 secured by bolts 113 to the adjacent end of an elongated, hollow spline shaft 114 having (see Figure 6) uniformly, angularly spaced, longitudinally extending spline ribs 116 adapted to slidably engage in complementary grooves 118 formed in the inwardly directed flange 119 of housing 106.

From the description so far provided, it will be apparent that the steering wheel 104, housing 106, and the hollow spline shaft 114 are all connected for conjoint rotational movement, and at the same time, the steering wheel and housing are slidably movable upon the spline shaft, and are normally biased rearwardly in respect to the shaft 114 by the compression, coil spring 110.

The shaft 114, at its forward end, is integrally formed with a collar 120, and forwardly of the collar, said shaft is integral with a cylindrical boss 122. The boss 122 extends within a bushing 124 of a bearing portion 125 formed upon the upper end of the cross member 22 of the frame.

The hollow shaft 96 extends through the boss 122, projecting a substantial distance forwardly beyond the cross member 22, and terminating a short distance forwardly of the front cross member 16, as best shown in Figure 3. Adjacent boss 122, shaft 96 extends through a large center opening of a drive gear 126 pinned by a circumferential series of connecting bolts 128 to the boss 122. Gear 126 is in mesh with an intermediate gear 130, which in turn meshes with a driven gear 132 connected to a stub shaft 133 for rotation therewith. Stub shaft 133 is connected at its forward end, by a universal joint 134, to a rock shaft 136, which extends forwardly, downwardly from a gear housing 138. The housing, at its upper end, has in its forward wall an opening normally closed by a disc-like closure 140 through which the connecting bolts 128 extend.

Thus, considering the rotatable parts of the steering mechanism, these include the steering wheel 104, the housing 106, the spline shaft 114, the gear 126, hollow shaft 96, and the closure 140.

Further, it will be noted that operation of the steering mechanism is effected regardless of the relative axial displacement of the spline shaft 114 and housing 106. Thus, in an emergency, if it is necessary to steer the vehicle with the steering wheel in its inner, dotted line position, the steering operation is capable of being effected without any loss in efficiency.

In Figure 1, it is shown that the steering mechanism for the front wheels 34, designated generally at 141, is basically conventional, and accordingly need not be described in detail hereinafter, including the usual tie rod, angular levers, etc.

As previously mentioned herein, the shock-absorbing mechanism includes not only recoil springs, shock-dampening link assemblies, and bumper members of resilient material, but also includes pneumatic cushions, inflating automatically responsive to a force directed against the front of the vehicle on impact, when the vehicle is engaged in a collision.

One of the pneumatic cushions is provided directly in the steering wheel, and is adapted to inflate in a rearward direction, beyond the plane of the steering wheel, as shown in dotted lines in Figure 5, thus to provide maximum protection for the driver of the vehicle. The cushion has been designated at 142, and comprises a hollow, elastic body of rubber or its equivalent, which is normally collapsed within the steering wheel as shown in full lines in Figure 5. The inflatable cushion 142 is centrally connected to an elongated air supply tube 144, being continuously in communication with said air supply tube. Tube 144 extends within the hollow steering column 96, and as shown at 146 (Figure 3) extends out of the forward end of the steering column, being then extended S-fashion below the steering column, and connected at its inlet end in communication with a source of compressed air under pressure.

The air supply apparatus has been generally designated at 148, and has been shown to particular advantage in Figure 7. Said apparatus includes a block 150 connected fixedly to the member 20 of the vehicle frame. Block 150 has a transverse, cylindrical chamber 152 in which is rotatably mounted a solid cylinder 154 having at its opposite ends gudgeons 156 projecting beyond opposite side surfaces of block 150 and formed, at their projecting ends, with non-circular portions receiving complementary portions on the convergent, rear ends of crank arms 158 the divergent, forward ends of which are pivotally connected to elongated links 160 (Figure 3). Links 160 are pivotally connected to the links 80, at 84, and thus on rearward movement of the links 80 the links 160 will be shifted in a rearward direction, so as to swing the crank arms 158 counterclockwise in Figure 3. As a result, the cylinder 154 is partially rotated, so as to register a transverse passage 162 thereof with a bore 164 formed in the block 150. The bore 164 is connected by a pipe 184 to a compressed air tank 182. Passage 162 has flared ends as shown at 165, so as to insure that all air passing through bore 164 will be directed into the passage 162.

Thus, cylinder 154 constitutes a valve plug, normally disposed in a flow-preventing position, but operated to a flow-permitting position responsive to a force developing on engagement of the vehicle in a front end collision.

When the valve plug 154 rotates to a flow-permitting position, it connects with the bore 164 a chamber 166 of a small block 168, that is fixedly secured to the block 150. The chamber 166 is in continuous communication with three, divergent branch passages 170, 172, 174 respectively. Passages 170, 174 are in communication with hoses or tubes 176, 178 respectively. Passage 172 is in communication with the tube or hose 146.

The tubes 176, 178, as shown in Figures 1 and 3, extend to opposite sides of the vehicle frame, and then extend rearwardly substantially in the vertical planes of the respective sides of the frame, being connected at their outlet ends to transversely extending, inflatable, elongated cushions 180. These are disposed within the vehicle, at any locations best suited for providing resilient, shock-absorbing walls for the occupants, which walls will absorb a substantial part of the shocks that would normally occur when the occupants of the vehicle are thrown forwardly thereagainst when the vehicle is in a collision.

Thus, although both cushions 180 are arranged in the illustrated example for protecting front seat passengers, one of the pneumatic cushions 180 could be located over the instrument panel and another along the back of the front seat, for the protection of the vehicle occupants seated on the front and back seats respectively.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. The combination, with a vehicle including a chassis, of a shock-absorbing apparatus comprising: a bumper mounted on said chassis and including a pair of bumper sections having overlapped, slidably related inner end portions and having outer end portions pivotally connected to the chassis; and a resilient cushion means engaged with the sections, said cushion means including a resilient element extending in front of the overlapped inner end portions, and an elongated member extending in back of the overlapped end portions of the bumper sections and having a forwardly opening groove receiving both the sections and said element.

2. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; and means connected between the bumper means and steering column, translating movement of the bumper means to said back position into movement of the steering column to its retracted position.

3. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; and means connected between the bumper means and steering column, translating movement of the bumper means to said back position into movement of the steering column to its retracted position, said motion-translating means including an articulated linkage, said motion-translating means further including a cylinder carried by the chassis and a spring-restrained plunger working in the cylinder and connected to said bumper means, said linkage being connected to the cylinder and piston for operation responsive to shifting of the piston inwardly of the cylinder by the backwardly moving bumper means.

4. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; and means connected between the bumper means and steering column, translating movement of the bumper means to said back position into movement of the steering column to its retracted position, said motion-translating means including an articulated linkage, said motion-translating means further including a cylinder carried by the chassis and a spring-restrained plunger working in the cylinder and connected to said bumper means, said linkage being connected to the cylinder and piston for operation responsive to shifting of the piston inwardly of the cylinder by the backwardly moving bumper means, the linkage including a first link connected to the plunger, and a second link fulcrumed intermediate its ends on the cylinder and connected at one end to the first link at its other end to the steering column.

5. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; means connected between the bumper means and steering column, translating movement of the bumper means to said back position into movement of the steering column to its retracted position; a series of normally deflated, pneumatic cushions arranged to protect the occupants of the vehicle; and means responding to said movement of the bumper means to a back position adapted for inflating said cushions.

6. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; means connected between the bumper means and steering column, translating movement of the bumper means to said back position into movement of the steering column to its retracted position; a series of normally deflated, pneumatic cushions arranged to protect the occupants of the vehicle; and means responding to said movement of the bumper means to a back position adapted for inflating said cushions, comprising a source of air under pressure, valve means normally preventing the flow of the air from said source, lines extending from the valve means to the several cushions, and a connection between the bumper means and valve means adapted for opening the valve means on movement of the bumper means to its back position.

7. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted postion longitudinally of the chassis away from the vehicle driver; means connected between the bumper means and steering column translating movement of the bumper means to said back position into movement of the steering column to its retracted position; a series of normally deflated, pneumatic cushions arranged to protect the occupants of the vehicle; and means responding to said movement of the bumper means to a back position adapted for inflating said cushions, comprising a source of air under pressure, valve means normally preventing the flow of air from said source, lines extending from the valve means to the several cushions, and a connection between the bumper means and valve means adapted for opening the valve means on movement of the bumper means to its back position, said connection including a link shifting rearwardly with and having a connection to the bumper means, said valve means being rotatable between its flow-preventing and flow-permitting positions, and a crank connected between the link and valve means for rotating the valve means on rearward shifting of the link.

8. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; means connected between the bumper means and steering column, translating movement of the bumper means to said back position into movement of the steering column to its retracted position; a series of normally deflated, pneumatic cushions arranged to protect the occupants of the vehicle; and means responding to said movement of the bumper means to a back position adapted for inflating said cushions, one of the cushions being disposed upon the steering column and expanding beyond the steering wheel when inflated.

9. The combination, with a vehicle chassis, of a shock-absorption apparatus comprising: bumper means mounted on the chassis for yielding movement to a back position on receiving the force of impact in a vehicle collision; a steering column mounted on the chassis for movement to a retracted position longitudinally of the chassis away from the vehicle driver; means connected between the bumper means and steering column, translating movement of the bumper means to said back position into movement of the steering column to its retracted position; a series of normally deflated, pneumatic cushions arranged to protect the occupants of the vehicle; and means responding to said movement of the bumper means to a back position adapted for inflating said cushions, one of the cushions being disposed upon the steering column and expanding beyond the steering wheel when inflated, others of the cushions being disposed in positions extending in front of occupants of the vehicle other than the driver.

References Cited in the file of this patent

UNITED STATES PATENTS

| | | |
|---|---|---|
| 1,182,395 | McKee | May 9, 1916 |
| 1,624,418 | Marsh | Apr. 12, 1927 |
| 1,985,113 | Smith | Dec. 18, 1934 |
| 2,477,933 | Labser | Aug. 2, 1949 |
| 2,563,339 | Kellogg | Aug. 7, 1951 |
| 2,649,311 | Hetrick | Aug. 18, 1953 |
| 2,793,900 | Marshall | May 28, 1957 |

FOREIGN PATENTS

| | | |
|---|---|---|
| 896,312 | Germany | Nov. 12, 1953 |